(12) United States Patent
Duong et al.

(10) Patent No.: US 12,071,959 B1
(45) Date of Patent: Aug. 27, 2024

(54) COMPRESSOR CASING WITH SLOTS AND GROOVES

(71) Applicant: PRATT & WHITNEY CANADA CORP., Longueuil (CA)

(72) Inventors: Hien Duong, Mississauga (CA); Christopher Chiang, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/461,705

(22) Filed: Sep. 6, 2023

(51) Int. Cl.
*F04D 29/52* (2006.01)
*F04D 29/32* (2006.01)
*F02C 3/06* (2006.01)

(52) U.S. Cl.
CPC ......... *F04D 29/526* (2013.01); *F04D 29/324* (2013.01); *F02C 3/06* (2013.01); *F05D 2220/323* (2013.01)

(58) Field of Classification Search
CPC ................ F04D 29/526; F04D 29/324; F05D 2220/323; F02C 3/06
USPC .................. 415/57.4, 119.4, 173.1, 914, 144
See application file for complete search history.

(56) References Cited

U.S. PATENT DOCUMENTS

| | | | |
|---|---|---|---|
| 4,239,452 A | 12/1980 | Roberts, Jr. | |
| 6,435,819 B2 | 8/2002 | Irie et al. | |
| 6,832,890 B2 | 12/2004 | Booth | |
| 10,539,154 B2 | 1/2020 | Mallina et al. | |
| 10,823,194 B2 | 11/2020 | Jothiprasad et al. | |
| 2008/0044273 A1* | 2/2008 | Khalid .................. | F04D 29/321 415/57.4 |
| 2011/0311354 A1* | 12/2011 | Goswami .............. | F04D 29/685 415/182.1 |
| 2016/0153360 A1* | 6/2016 | Jothiprasad ............. | F01D 25/24 415/173.1 |
| 2016/0169017 A1* | 6/2016 | Giacché ................ | F04D 29/526 415/168.1 |

* cited by examiner

*Primary Examiner* — Shafiq Mian
(74) *Attorney, Agent, or Firm* — NORTON ROSE FULBRIGHT CANADA LLP

(57) ABSTRACT

A compressor for an aircraft engine, has: a gaspath extending around a central axis between a radially-inner wall and a radially-outer wall; a rotor having blades circumferentially distributed around the central axis, the blades having airfoils extending from roots to tips along a span and extending from leading edges to trailing edges along a chord, the airfoils extending across the gaspath; grooves defined in an inner face of the radially-outer wall, circumferentially distributed around the central axis, and having groove lengths extending in a first direction having a circumferential component relative to the central axis, the grooves located between the leading edges and the trailing edges of the airfoils; and slots defined in the inner face of the radially-outer wall, circumferentially distributed around the central axis, and having slot lengths extending in a second direction having an axial component relative to the central axis, the slots projecting from the grooves.

20 Claims, 6 Drawing Sheets

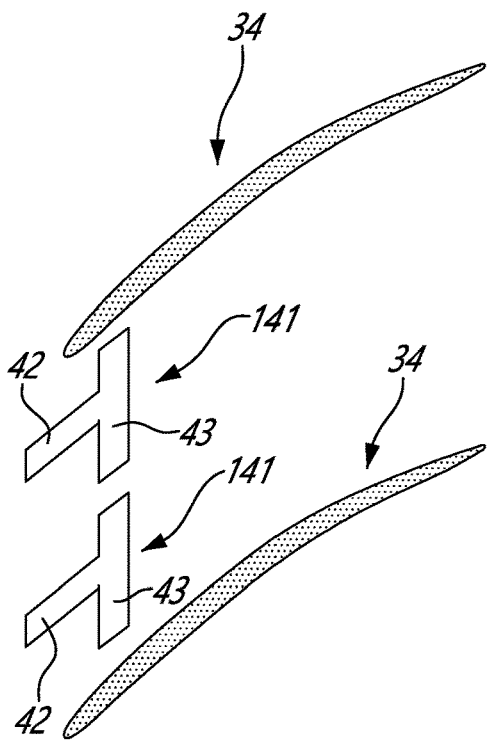
FIG. 6
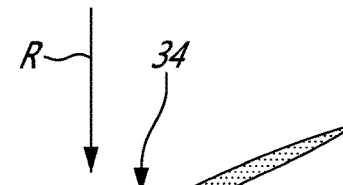
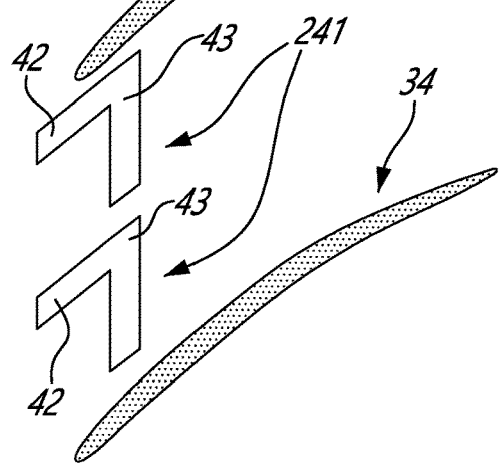
FIG. 7
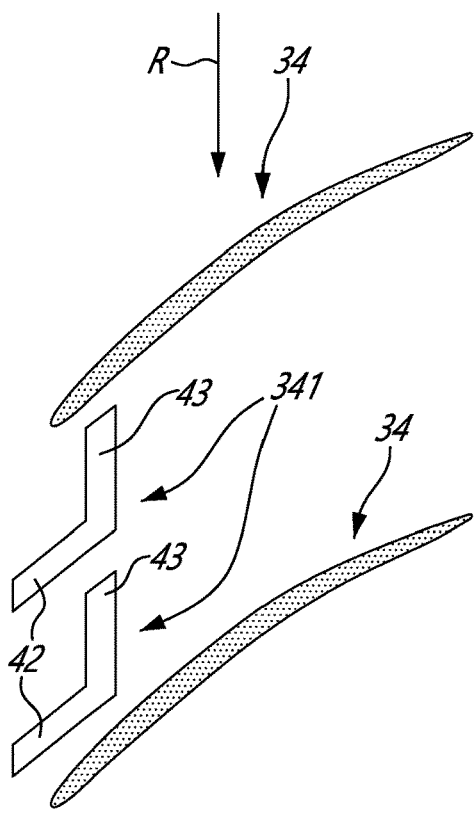
FIG. 8

COMPRESSOR CASING WITH SLOTS AND GROOVES

TECHNICAL FIELD

The application relates generally to aircraft engines and, more particularly, to compressor sections of such engines and to casing treatments of compressor sections to improve performance thereof.

BACKGROUND

Since there is a continuous need to reduce engine weight, length, and cost, and to improve performance, compressor rotors are required to produce more work per stage. The increase in workload per stage may lead to compressor stability issues. For compressors whose operating range is controlled by rotor stalling, the stall initiation may be driven by rotor leakage flow. Hence, improvements are sought.

SUMMARY

In one aspect, there is provided a compressor for an aircraft engine, comprising: a gaspath extending around a central axis and defined between a radially-inner wall and a radially-outer wall; a rotor having blades circumferentially distributed around the central axis, the blades having airfoils extending from roots to tips along a span and extending from leading edges to trailing edges along a chord, the airfoils extending across the gaspath; grooves defined in an inner face of the radially-outer wall, circumferentially distributed around the central axis, and having groove lengths extending in a first direction having a circumferential component relative to the central axis, the grooves located between the leading edges and the trailing edges of the airfoils; and slots defined in the inner face of the radially-outer wall, circumferentially distributed around the central axis, and having slot lengths extending in a second direction having an axial component relative to the central axis, the slots projecting from the grooves.

The compressor described above may include any of the following features, in any combinations.

In some embodiments, the grooves extend solely circumferentially relative to the central axis.

In some embodiments, the slots extend parallel to the chord of the airfoils.

In some embodiments, the slots have a radial depth between slot ends and slot openings, the slot openings located at the inner face, the slots flaring in a depthwise direction away from the slot openings.

In some embodiments, a slot of the slots has a radial depth between a slot end and a slot opening, the slot opening located at the inner face, the slot opening being circumferentially offset from the slot end.

In some embodiments, the grooves have a radial depth between groove openings and groove ends, the groove openings at the inner face, the grooves flaring in a depthwise direction away from the groove openings.

In some embodiments, a groove of the grooves extends axially from an upstream wall to a downstream wall, the upstream wall sloping towards the downstream wall and towards a groove opening of the groove openings.

In some embodiments, each of the grooves is intersected by two of the slots being circumferentially spaced apart from one another.

In some embodiments, the slot lengths extend from upstream ends to downstream ends, and wherein the upstream ends of the slots are located upstream of the leading edges of the airfoils relative to a flow of gas through the gaspath.

In some embodiments, a number of the grooves equals a number of inter-blade spacing, each of the inter-blade spacing defined between two circumferentially adjacent blades.

In another aspect, there is provided an aircraft engine, comprising: a gaspath extending around a central axis and defined between a radially-inner wall and a radially-outer wall; a compressor rotor having blades circumferentially distributed around the central axis, the blades having airfoils extending from roots to tips along a span and extending from leading edges to trailing edges along a chord, the airfoils extending across the gaspath; and recesses distributed around the central axis and extending from a baseline surface of the radially-outer wall and away from the gaspath, the recesses at least partially axially overlapped by the tips of the airfoils, the recesses having chord-wise sections extending lengthwise in a direction parallel to the chords, and transversal sections extending lengthwise in a direction transversal to the chord-wise sections, the transversal sections disposed downstream from the leading edges of the blades, the chordwise sections projecting from the transversal sections.

The aircraft engine described above may include any of the following features, in any combinations.

In some embodiments, the transversal sections extend solely circumferentially relative to the central axis.

In some embodiments, the chord-wise sections have upstream ends located upstream of the leading edges of the airfoils.

In some embodiments, the chord-wise sections have a radial depth extending from openings at the baseline surface of the radially-outer wall to ends, the chord-wise sections flaring in a depthwise direction away from the openings.

In some embodiments, a chord-wise section of the chord-wise sections has a radial depth between an opening at the baseline surface to an end, the opening being circumferentially offset from the end.

In some embodiments, the chordwise sections project upstream from the transversal sections relative to a flow in the gaspath.

In some embodiments, the transversal sections have a radial depth between openings at the baseline surface to ends, the transversal sections flaring in a depthwise direction away from the openings.

In some embodiments, a transversal section of the transversal sections extends axially from an upstream wall to a downstream wall, the upstream wall sloping towards the downstream wall and towards an opening of the openings.

In some embodiments, each of the transversal sections is intersected by two of the chord-wise sections being circumferentially spaced apart from one another.

In some embodiments, a number of the transversal sections equals a number of inter-blade spacing, each of the inter-blade spacing defined between two circumferentially adjacent blades.

BRIEF DESCRIPTION OF THE DRAWINGS

Reference is now made to the accompanying figures in which:

FIGS. 6 to 8 are top views illustrating casing treatments in accordance with other embodiments.

DETAILED DESCRIPTION

Figure 1:
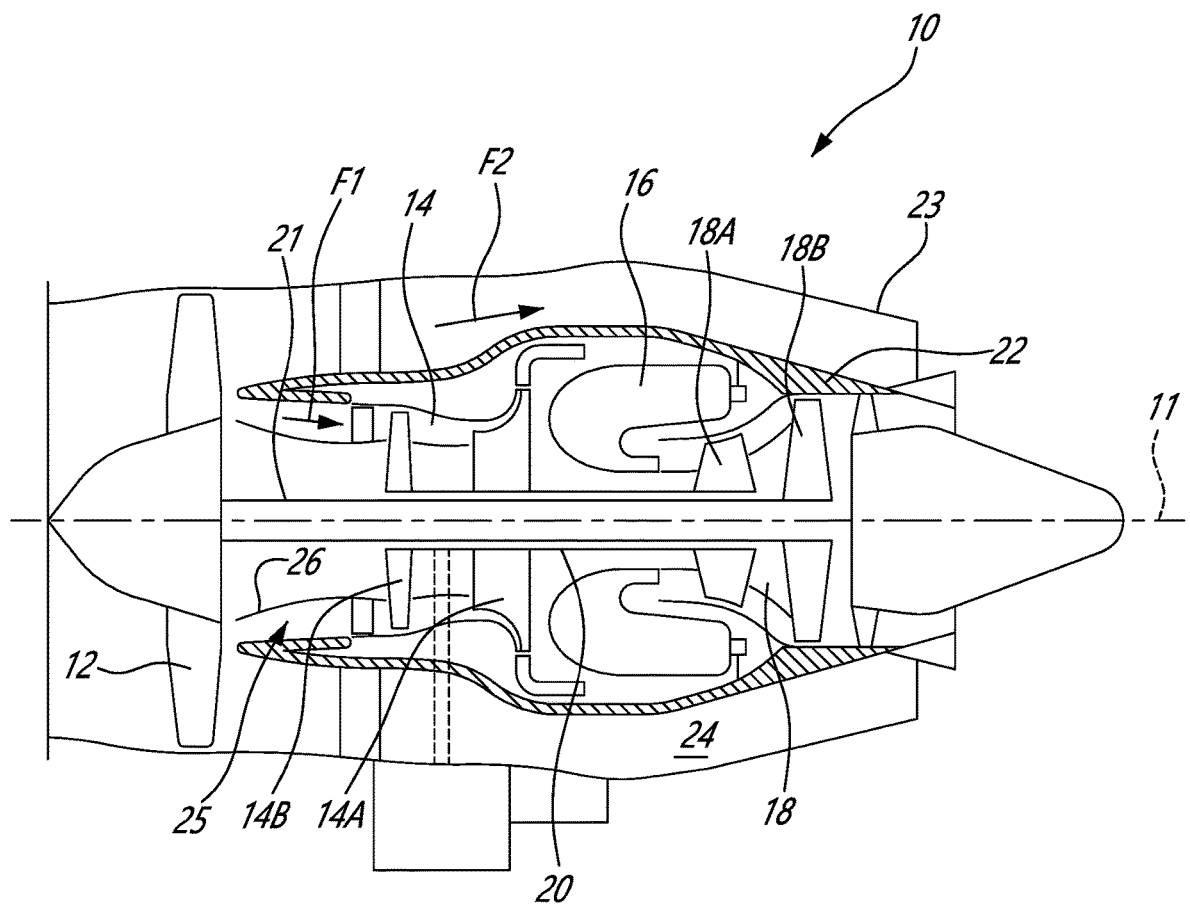
FIG. 1 is a schematic cross sectional view of an aircraft engine depicted as a gas turbine engine.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10. In the embodiment shown, the gas turbine engine 10 comprises a high-pressure spool having a high-pressure shaft 20 drivingly engaging a high-pressure turbine 18A of the turbine section 18 to a high-pressure compressor 14A of the compressor section 14, and a low-pressure spool having a low-pressure shaft 21 drivingly engaging a low-pressure turbine 18B of the turbine section 18 to a low-pressure compressor 14B of the compressor section 14 and drivingly engaged to the fan 12. In the present embodiment, the low-pressure compressor 14B is an axial compressor whereas the high-pressure compressor 14A is a centrifugal compressor. The principle of the present disclosures are applicable to any compressor rotor, whether it be axial or centrifugal. It will be understood that the contents of the present disclosure may be applicable to any suitable engines, such as turboprops and turboshafts, and reciprocating engines, such as piston and rotary engines without departing from the scope of the present disclosure.

In the depicted embodiment, the gas turbine engine 10 is a turbofan engine in which a flow of air flowing through the fan 12 is split in a core flow F1 and a bypass flow F2 downstream of the fan 12. The gas turbine engine 10 has an inner casing 22 surrounding a core of the gas turbine engine 10; the core including the compressor section 14, the combustor 16, and the turbine section 18. The gas turbine engine 10 has an outer casing 23 disposed radially outwardly of the inner casing 22. A bypass duct 24, which is annular, is defined radially between the outer casing 23 and the inner casing 22. The bypass flow F2 flows in the bypass duct 24. The core flow F1 flows within a gaspath 25 defines radially between the inner casing 22 and a core casing 26. The core casing 26 is located radially inwardly of the inner casing 22.

Figure 2:
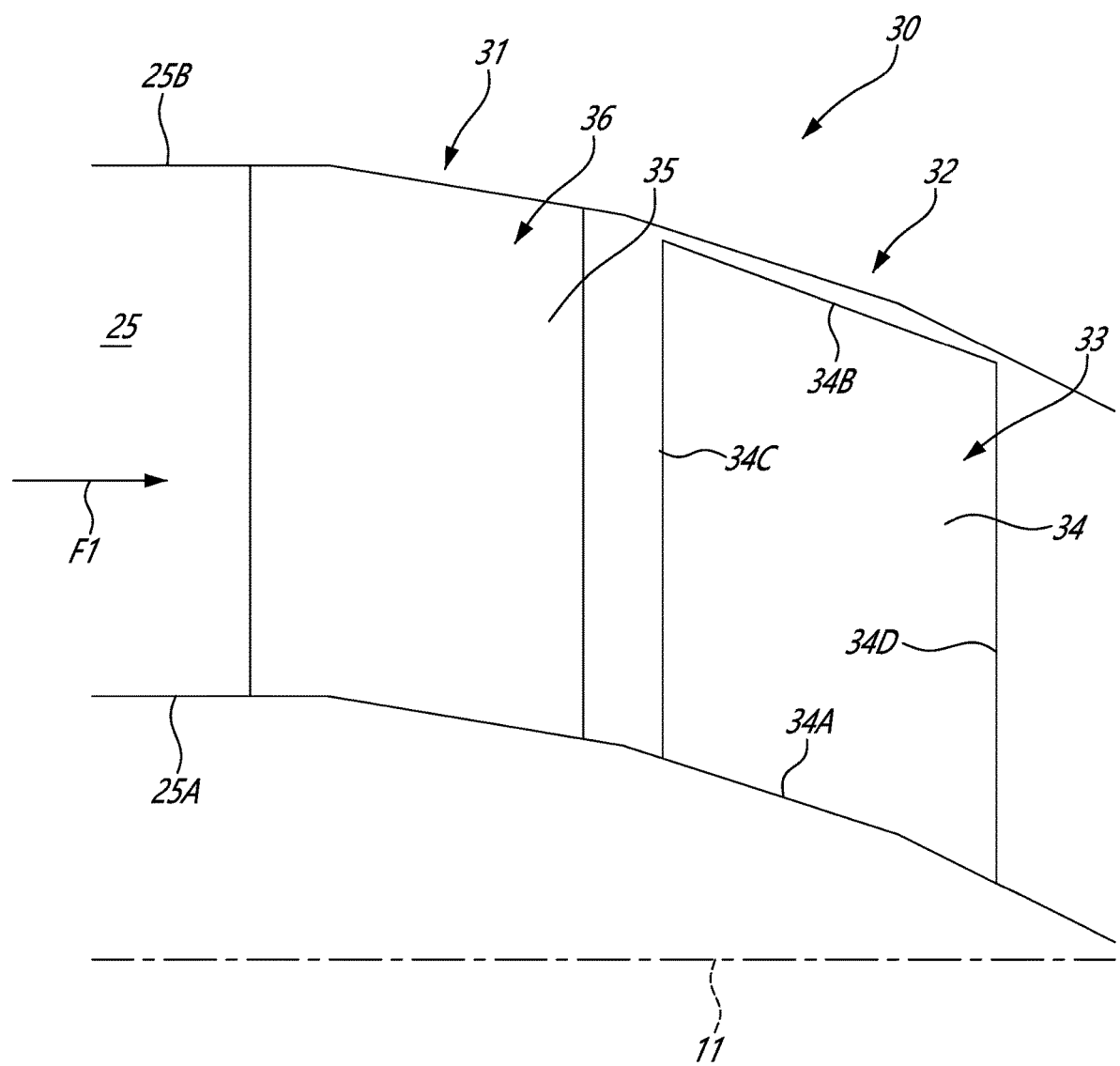
FIG. 2 is a cross-sectional view of the aircraft engine of FIG. 1 illustrating a compressor stage thereof.
Figure 3:
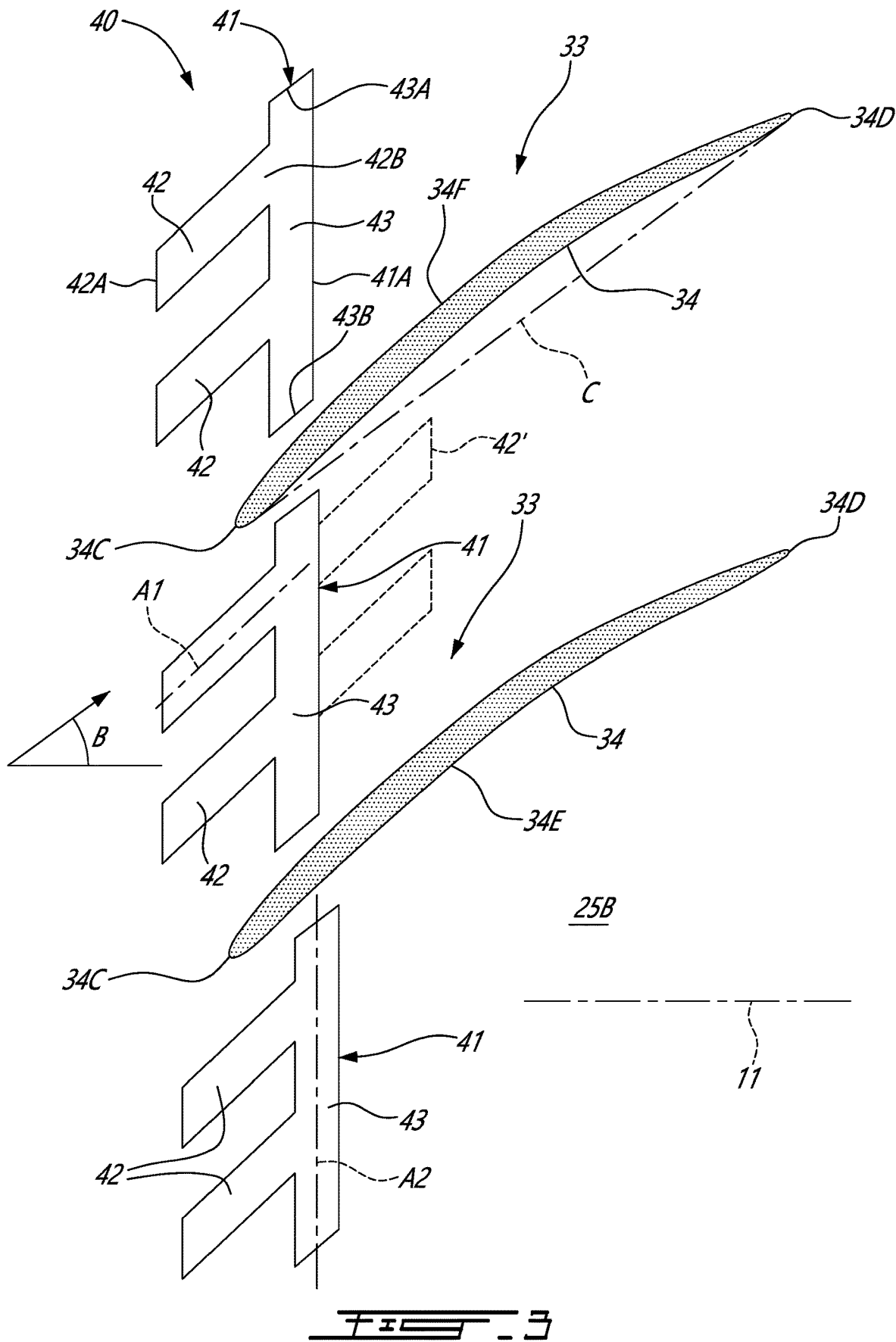
FIG. 3 is a top view illustrating a casing treatment of the compressor stage of FIG. 3.

Referring now to FIG. 2, a compressor stage is shown at 30. The compressor stage 30 may be part of the low-pressure compressor 14B of the compressor section 14 of the gas turbine engine 10 of FIG. 1. The compressor stage 30 includes a stator 31 and a rotor 32 in fluid communication with the stator 31 and located downstream of the stator 31 relative to a flow of air flowing through the gaspath 25 of the gas turbine engine 10. In some embodiments, the rotor 32 may be located upstream of the stator 31. The rotor 32 is rotatable about the central axis 11 relative to the stator 31. The rotor 32 includes blades 33 having airfoils 34 circumferentially distributed about the central axis 11. The airfoils 34 extends from a root 34A to a tip 34B along a span and from a leading edge 34C to a trailing edge 34D along a chord. The airfoils 34 have a thickness defined between a pressure side 34E (FIG. 3) and a suction side 34F (FIG. 3). The root 34A is secured to a hub engaged by one of the shafts of the engine. The blades 33 may be removably mounted to the hub. Alternatively, the rotor may be a blisk or integrally bladed rotor (IBR) in which the blades and the hub are parts of a single monolithic body without departing from the scope of the present disclosure. The blades 33 may have blade platforms (not shown) slidably received within correspondingly shaped slots defined in the hub.

The gaspath 25 is defined between a radially-inner wall 25A and a radially-outer wall 25B. The radially-outer wall 25B may be defined by shrouds mounted to the inner casing 22 whereas the radially-inner wall 25A may be defined by the hub from which the blades 33 protrude. As shown in FIG. 2, the tips 34B of the airfoils 34 of the blades 33 are radially spaced apart from the radially-outer wall 25B to avoid contact during rotation of the rotor 32.

The stator 31 includes vanes 35 circumferentially distributed about the central axis 11. The vanes 35 have airfoils 36, which typically have a shape different than that of the airfoils 34 of the blades 33.

It has been observed that, in typical compressors, as the gas turbine engine 10 is throttled back, the rotor 32 may be operating on/near stall side. In some cases, leakage flow at the tip may initiate rotating stall. As the compressor is throttled back, its airfoils may experience higher incidence, and vortices may be formed at the tips of the blades. These vortices may move upstream toward the leading edge of an adjacent blade. Blade stall may happen when this tip vortex reaches ahead of the adjacent blade leading edge and impinges on the pressure side of the adjacent blade at the trailing edge. A shock boundary layer interaction may occur and, in combination with leakage flow, large flow blockage may occur near a trailing region. This may result in low performance and operating range. The compressor stage 30 of FIG. 2 may at least partially mitigate these drawbacks.

Referring now to FIG. 3, the compressor stage 30 includes a casing treatment 40 defined by the radially-outer wall 25B. The casing treatment 40 includes recesses 41 circumferentially distributed about the central axis 11. The recesses 41 extend from a baseline surface BS (FIGS. 4-5) of the radially-outer wall 25B and away from the gaspath 25. The baseline surface BS corresponds to a surface of the radially-outer wall 25B if the recesses 41 were absent. This baseline surface BS faces towards the central axis 11 and may be referred to as an inner surface in the present disclosure. The recesses 41 are separated from one another. Put differently, the recesses 41 are not linked or do not fluidly communicate with one another other than via the gaspath 25. The recesses 41 are at least partially overlapped by the tips 34B of the airfoils. The overlap corresponds to an axial overlap such that at least a portion of the recesses 41 is located downstream of the leading edges 34C and upstream of the trailing edges 34D of the airfoils 34 relative to the core flow F1.

The recesses 41 have recess openings 41A on the baseline surface BS of the radially-outer wall 25B. FIG. 3 illustrates outlines of those recess openings 41A. As shown in FIG. 3, a number of the recesses 41 equals a number of inter-blade spacing, which correspond to circumferential spacing defined between each two circumferentially adjacent blades.

Thus, the recesses 41 may span a circumferential distance that is at most a circumferential distance between the pressure side 34E of one of the airfoils 34 and the suction side 34F of an adjacent one of the airfoils 34. Having the recesses 41 circumferentially separated from one another may provide a good balance of flow interaction between the recesses 41 and the tips 34B of the airfoils 34. Moreover, having the recesses 41 span the inter-blade spacing may ensure that mixing losses are minimized while ensuring that the tip leakage flow is not trapped inside said recesses 41 and is re-introduced back into the gaspath 25.

In some embodiments, the recesses 41 include slots 42 and grooves 43. The slots 42 may be referred to as chordwise sections of the recesses 41 whereas the grooves 43 may be referred to as transversal sections of the recesses 41. The slots 42 are distributed around the central axis 11 and extend lengthwise in a first direction A1 having an axial component relative to the central axis 11. In other words, the slots 42 have slot lengths extending in the first direction A1. The grooves 43 are distributed around the central axis 11 and extend lengthwise in a second direction A2 having a circumferential component relative to the central axis 11. In other words, the grooves 43 have groove lengths extending in the second direction A2. The "lengthwise" extension direction of the slots 42 and of the grooves 43 implies that a dimension of the slots 42 and the grooves 43 is greater in this direction (e.g., first direction A1 for the slots 42 and second direction A2 for the grooves 43) than in other directions being parallel to the baseline surface BS. In the present embodiment, the first direction A1 is parallel to a chord C of the airfoils 34 at the tips 34B of the airfoils 34. The chord C is defined in the context of the present disclosure as a straight line interconnected the leading edge 34C to the trailing edge 34D. The first direction A1 may be angled relative to the central axis by an angle B, which may also correspond to an angle of attack of the airfoils 34; the angle of attack defined between the chord C and the central axis 11. The second direction A2 may be solely circumferential relative to the central axis 11 such that the grooves 43 extend solely circumferentially relative to the central axis 11. In other words, the second direction A2 may be devoid of an axial component relative to the central axis 11. Therefore, the slots 42 may extend substantially parallel to the chords C whereas the grooves 43 may extend transversally to the slots 42. The expression "substantially" is meant to encompass slight deviations caused by manufacturing tolerances, for instance. It will be appreciated that the groove lengths and the slot lengths may vary from groove to groove and from slot to slot in some embodiments. In other words, in the represented embodiments, all of the slots 42 have the same slot length and all of the grooves 43 have the same groove length, but this may not be the case.

Still referring to FIG. 3, the slots 42 and the grooves 43 intersect one another. Put differently, the slots 42 merge into the grooves 43. The slots 42 and the grooves 43 fluidly communicate to one another via a flow path that extend from the slots 42 to the grooves 43 independently of the gaspath 25. In the depicted embodiment, each of the grooves 43 is intersected by two of the slots 42, which are circumferentially spaced apart from one another. There may be twice as many slots 42 than grooves 43. However, only one slot per groove or more than two slots per groove may be used in some embodiments. The grooves 43 may be located downstream of the slots 42. Put differently, the slots 42 project upstream from the grooves relative to the core flow F1 through the gaspath 25. In an alternate embodiment, the grooves 43 may be located upstream of the slots 42. This alternate position is shown at 42' on FIG. 3.

The disclosed recesses 41 may improve rotor stability. They may mitigate shroud wall high swirl and low momentum flow to help strengthen wall flow while generating flow interaction with the core flow F1 to at least partially inhibit or deflect leakage flow. This may improve stall margin of the compressor. The slots 42 may contribute to improve stall margin and may create momentum exchange. The slots 42 may be located near the leading edges 34C of the airfoils where leakage flow has been observed by the inventors of the instant disclosure to be the strongest. The slots 42 may increase axial momentum. The grooves 43 may be located further downstream inside rotor passage where Mach number is higher. Locating the grooves 43 as such may minimize performance drawbacks while converting the circumferential momentum of the flow in axial momentum to mitigate tip leakage. The inventors of the present disclosures have discovered that combining the slots 42 and the grooves 43 as described herein may unexpectedly at least partially alleviate their respective penalties to improve performance of the rotor 32. In other words, combining the slots 42 communicating or merging into the grooves 43 may allow to combine the benefits of both while minimizing their respective penalties. This may yield a more performant rotor with improve stall margin. In the depicted embodiment, the recesses 41 intercept throats defined between each two adjacent airfoils 34.

Figure 5:
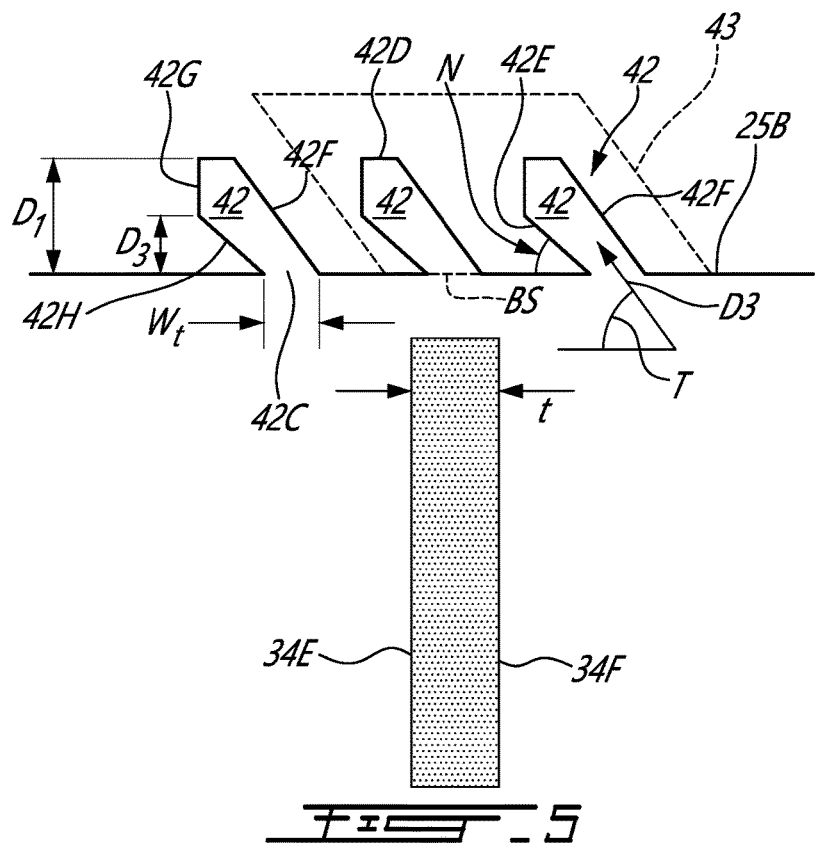
FIG. 5 is a cross-sectional view of the compressor stage and casing treatment of FIG. 3 taken on a plane normal to the central axis of the aircraft engine and looking in a downstream direction.

Referring to FIGS. 3 and 5, the slots 42 extend lengthwise from upstream ends 42A to downstream ends 42B and extend from the baseline surface BS along a radial depth. The upstream ends 42A may be located upstream of the leading edges 34C of the airfoils 34 while the downstream ends 42B may be located between the leading edges 34C and the trailing edges 34D of the airfoils 34. The slots 42 may thus overlap the leading edges 34C of the airfoils 34. The slots 42 further have a slot depth D1, also referred to as a radial depth, extending between slot openings 42C (FIG. 5) defined at the baseline surface BS of the radially-outer wall 25B and slot ends 42D (FIG. 5) being radially spaced apart from the baseline surface BS of the radially-outer wall 25B. The slots 42 thus extend in a direction having a radial component from the slot openings 42C to the slot ends 42D. The slots 42 may slope circumferentially from the slot openings 42C to the slot ends 42D. The slots 42 may slope in a direction of rotation of the rotor. In other words, each of the slot openings 42C is circumferentially offset from a respective one of the slot ends 42D. As shown, the slot openings 42C are located rearward of the slot ends 42D relative to a direction of rotation of the rotor. Hence, the tips 34B of the airfoils 34 will be in register with a respective one of the slot openings 42C before being in register with a corresponding one of the slot ends 42D as the airfoils 34 rotate. Hence, the slots may extend circumferentially from the slot opening to the slot end and in the same direction as the direction of rotation of the rotor.

As shown in FIG. 5, the slots 42 are bounded circumferentially by a first wall 42E and by a second wall 42F being circumferentially spaced apart from the first wall 42E. The first wall 42E includes straight section 42G and a sloping section 42H. The sloping section 42H extends from the straight section 42G and ends at the radially-outer wall 25B. The straight section 42G may be omitted in some embodiments. Both of the sloping section 42H of the first wall 42E and the second wall 42F slope in a circumferential direction relative to the central axis 11 towards the slot opening 42C. A slope direction of the first wall 42E and of the second wall 42F may be in the same direction as a direction of rotation of the rotor 32 about the central axis 11. A slope angle T of the slots 42 may be from about 10 degrees to about 45 degrees. The expression "about" implies variations of plus of minus 10% in this disclosure. The slope angle T is defined between a slope direction D3 of the slots 42 and the radially-outer wall 25B.

In the depicted embodiment, the slots 42 expand from the slot openings 42C to the slot ends 42D. Stated differently, the slots 42 have a slot depth D1, also referred to as a radial depth, between the slot ends 42D, or slot bottoms, and the slot openings 42C. The slots 42 flare in a depthwise direction away from the slot openings 42C. More specifically, a distance between the sloping section 42H of the first wall 42E and the second wall 42F increases from the slot opening 42C towards the slot end 42D. This may create an acceleration of the air exiting the slots 42 thereby increasing an axial momentum injected into the gaspath 25. Moreover, this configuration is such that the slots 42 define a volume configured for suctioning the flow from the gaspath 25. Put differently, the shape of the slots 42 may create a throat at the radially-outer wall 25B to accelerate the flow to increase momentum. An angle N defined between the sloping section 42H of the first wall 42E and the radially-outer wall 25B ranges from about 10 degrees to about 45 degrees. This angle N is thus different than an angle at which the second wall 42F intersects the radially-outer wall 25B.

In the depicted embodiment, a ratio (D1/D3) of a slot depth D1 of the slots 42 to a height D3 of the sloping section 42H ranges from about 1.1. to about 5. The slot depth D1 is a radial distance relative to the central axis 11 from the slot openings 42C to the slot ends 42D. The airfoils 34 have a thickness t between the pressure and suction sides and the slot openings 42C have a circumferential width Wt taken along a circumferential direction relative to the central axis 11. A ratio (Wt/t) of the circumferential width Wt to the thickness t ranges from about 0.5 to about 5. Herein, the thickness t corresponds to the maximum thickness of the airfoils 34 at the tips 34B.

Figure 4:
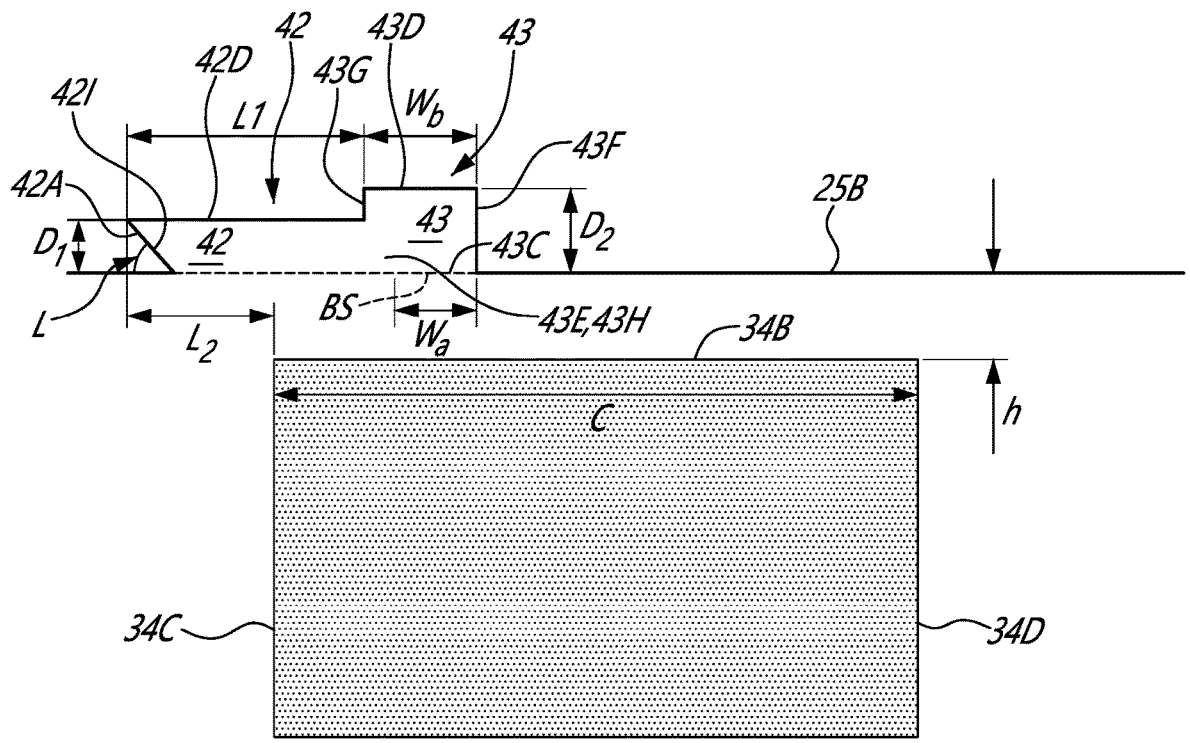
FIG. 4 is a cross-sectional view of the compressor stage and casing treatment of FIG. 3 taken on a plane containing a central axis of the aircraft engine.

As shown on FIG. 4, the slots 42 have an upstream-most walls 421 at the upstream ends 42A. The upstream-most walls 421 may slope in a downstream direction towards the slot openings 42C. An angle L defined between the upstream-most wall 421 and the radially-outer wall 25B may range from about 10 degrees to about 45 degrees.

Referring to FIGS. 3 and 4, the grooves 43 extend lengthwise from first ends 43A to second ends 43B in the direction of rotation of the rotor 32, and extend from the baseline surface BS along a radial depth. The grooves 43 have groove openings 43C (FIG. 4) on baseline surface BS of the radially-outer wall 25B and groove ends 43D being radially spaced apart from the baseline surface BS of the radially-outer wall 25B. The grooves 43 thus extend in a direction having a radial component from the groove openings 43C to the groove ends 43D. The grooves 43 may be located downstream of the leading edges 34C of the airfoils 34 relative to the core flow F1 (FIG. 1). The grooves 43 may thus be located axially between the leading edges 34C and the trailing edges 34D of the airfoils 34. In the depicted embodiment, a number of the grooves 43 equals a number of the inter-blade spacing. In some configurations, there may be more or less grooves than the inter-blade spacing. The grooves 43 are not fully annular. The grooves 43 are thus circumferentially interrupted. As illustrated in FIG. 5 with a dashed line, the grooves 43 may slope circumferentially. More specifically, the groove end 43D may be circumferentially offset from the groove opening 43C. Hence, the grooves extend circumferentially from the groove opening to the groove end and in the same direction as the direction of rotation of the rotor.

As shown in FIG. 4, the grooves 43 expand from the groove openings 43C to the groove ends 43D. Put differently, the grooves 43 have a groove depth D2, also referred to as a radial depth, between the groove openings 43C and the groove ends 43D (or groove bottoms). The grooves 43 flare in a depthwise direction away from the groove openings 43C. The grooves 43 are bounded axially between an upstream wall 43E and a downstream wall 43F. The upstream wall 43E may have a straight section 43G and a sloping section 43H extending from the straight section 43G to the radially-outer wall 25B. The straight section 43G may be omitted in some embodiments. The sloping section 43H of the upstream wall 43E extends in a downstream direction towards the downstream wall 43F and towards the groove opening 43C. In the depicted embodiment, an angle L defined between the sloping section 43H and the radially-outer wall 25B may range from about 10 degrees to about 45 degrees. The grooves 43 may receive air via the groove openings 43C. The expanding configuration of the grooves 43 is such that the grooves 43 defines a volume configured for suctioning the flow from the gaspath 25. The air may create vortices in the grooves 43 and exit the grooves 43 via the groove openings 43C and the sloping section 43H may guide the flow in a downstream direction towards the trailing edges 34D of the airfoils 34. This may help in increasing the axial momentum of the flow.

Referring to FIGS. 4-5, the grooves 43 have a groove depth D2 extending from the groove openings 43C to the groove ends 43D. A ratio (D2/D1) of the groove depth D2 to the slot depth D1 may range from about 0.2 to about 5. The slot 42 has a length L1 from the upstream ends 42A to the downstream ends 42B. The length L1 is taken along the central axis 11. A distance L2 is defined between the upstream end 42A of the slots 42 and the leading edges 34C of the airfoils 34. The distance L2 is an axial distance relative to the central axis 11. A ratio (L1/L2) of the length L1 of the slots 42 to the distance L2 between the upstream ends 42A of the slots 42 and the leading edges 34C of the airfoils may range from about 1 to about 5. A ratio (L2/C) of the distance L2 between the upstream ends 42A of the slots 42 and the leading edges 34C of the airfoils and the chord C of the airfoils 34 may range from about 0.1 to about 0.5. The groove openings 43C have an opening length Wa taken axially relative to the central axis 11 and an end length Wb taken axially relative to the central axis 11. A ratio (Wb/Wa) of the end length Wb to the opening length Wa may range from about 1 to about 3. The tips 34B of the airfoils 34 is radially spaced apart from the radially-outer wall 25B by a radial gap h. A ratio (D2/h) of the groove depth D2 to the radial gap h may range from about 0.5 to about 5.

The different ratios and angles defined herein above may increase an impact of the slots 42 and the grooves 43 on the performance (e.g., stall margin) of the compressor rotor.

Referring now to FIGS. 6-7, alternative configurations of recesses, each including grooves and slots, are shown. In the configuration of FIG. 6, there may be two recesses 141 for each inter-blade spacing. Each of those recesses 141 includes a single one of the slots 42 intersecting a groove 43. The recesses 141 may thus be T-shaped. The two recesses 141 are circumferentially spaced apart from one another. The slots 42 may intersect the grooves 43 at or proximate a center of the grooves 43. The features of the slots 42 and of the grooves 43 described above may apply for the recesses 141 of FIG. 6.

As shown in FIG. 7, each inter-blade spacing may include two recesses 241. The two recesses 241 each includes a single slot 42 and a single groove 43 intersecting one another to define a L-shape. In the present case, the grooves 43 extend from a downstream end of the slot 42 in a direction of rotation R of the rotor. The features of the slots 42 and of the grooves 43 described above may apply for the recesses 240 of FIG. 7.

As shown in FIG. 8, each inter-blade spacing may include two recesses 341. The two recesses 341 each includes a single slot 42 and a single groove 43 intersecting one another to define a L-shape. In the present case, the grooves 43 extend from a downstream end of the slot 42 in a direction opposite the direction of rotation R of the rotor. The features of the slots 42 and of the grooves 43 described above may apply for the recesses 241 of FIG. 7.

Figure 9:
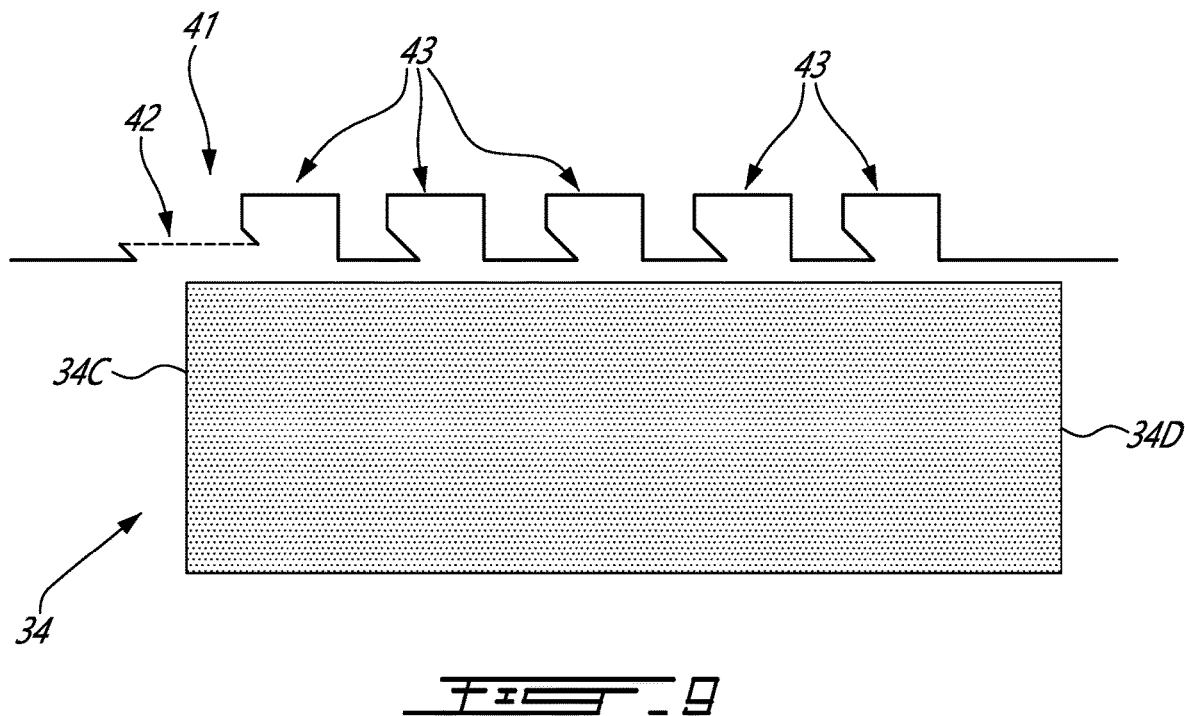
FIGS. 9 and 10 are cross-sectional views of the compressor stage and of casing treatments in accordance with other embodiments.
Figure 10:
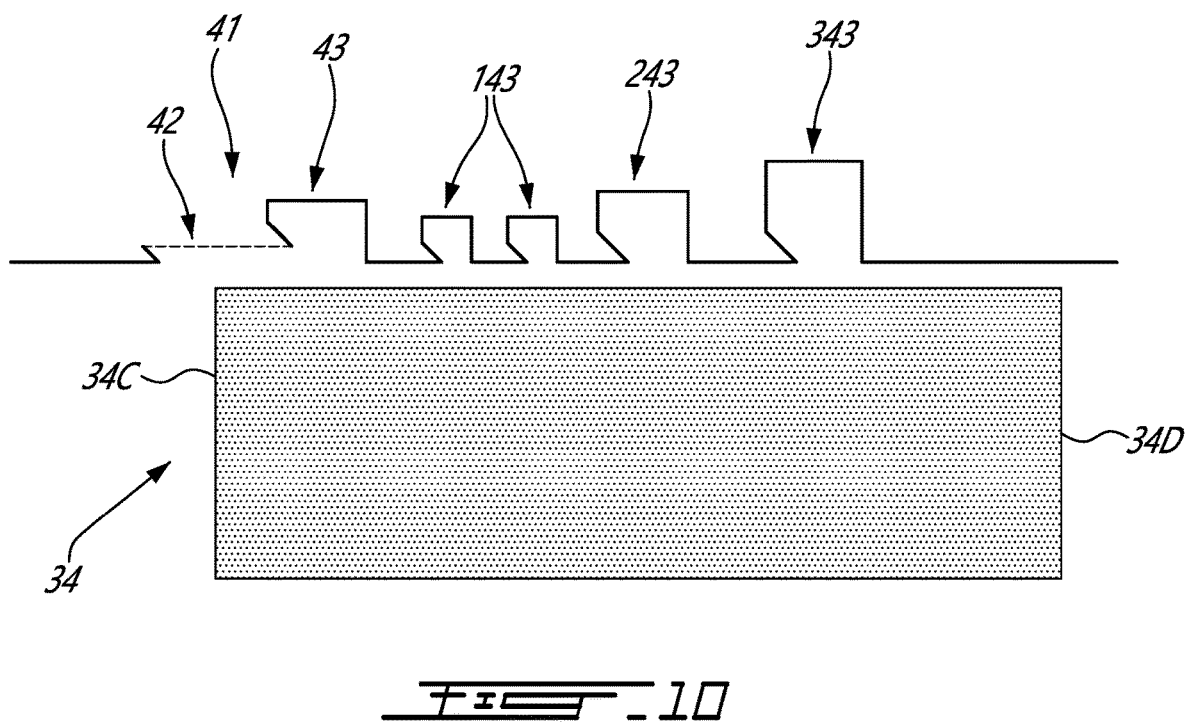

Referring now to FIGS. 9-10, in the embodiment illustrated, a plurality of grooves 43 may be located downstream of the recesses 41. Each of the grooves 43 may be shaped similarly as the grooves 43 of the recesses described above. In FIG. 10, a plurality of grooves may be located downstream of the recesses 41. The grooves include first grooves 143 downstream of the recesses 41, a second groove 243 downstream of the first grooves 143, and a third groove 343 downstream of the second groove 243. The first grooves 143 include two first grooves 143 but less or more is contemplated. Similarly, more than one second groove 243 and/or more than one third groove 343 may be used. The first, second, and third grooves are free from connection to a slot. The third groove 343 may enclose a bigger volume than that of the second grooves 243, which may itself enclose a bigger volume than that of the first grooves 143, which enclose smaller volumes than the groove 43. Other configurations are contemplated.

The disclosed recesses may improve rotor stability. Rotor shrouds, which define the radially-outer wall 25B, may be machined with the disclosed slots and grooves with the disclosed depths/widths to stimulate flow recirculation and the interaction with the gaspath to improve rotor stability. The disclosed casing treatment 40 may help to mitigate larger tip clearance. The disclosed casing treatment may improve engine overall performance while reducing development time for any growth version of the same engine.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:
1. A compressor for an aircraft engine, comprising:
   a gaspath extending around a central axis and defined between a radially-inner wall and a radially-outer wall;
   a rotor having blades circumferentially distributed around the central axis, the blades having airfoils extending from roots to tips along a span and extending from leading edges to trailing edges along a chord, the airfoils extending across the gaspath;
   grooves defined in an inner face of the radially-outer wall, circumferentially distributed around the central axis, and having groove lengths extending in a first direction having a circumferential component relative to the central axis, the grooves located between the leading edges and the trailing edges of the airfoils; and
   slots defined in the inner face of the radially-outer wall, circumferentially distributed around the central axis, and having slot lengths extending in a second direction having an axial component relative to the central axis, the slots projecting from the grooves.

2. The compressor of claim 1, wherein the grooves extend solely circumferentially relative to the central axis.

3. The compressor of claim 1, wherein the slots extend parallel to the chord of the airfoils.

4. The compressor of claim 1, wherein the slots have a radial depth between slot ends and slot openings, the slot openings located at the inner face, the slots flaring in a depthwise direction away from the slot openings.

5. The compressor of claim 1, wherein a slot of the slots has a radial depth between a slot end and a slot opening, the slot opening located at the inner face, the slot opening being circumferentially offset from the slot end.

6. The compressor of claim 1, wherein the grooves have a radial depth between groove openings and groove ends, the groove openings at the inner face, the grooves flaring in a depthwise direction away from the groove openings.

7. The compressor of claim 6, wherein a groove of the grooves extends axially from an upstream wall to a downstream wall, the upstream wall sloping towards the downstream wall and towards a groove opening of the groove openings.

8. The compressor of claim 1, wherein each of the grooves is intersected by two of the slots being circumferentially spaced apart from one another.

9. The compressor of claim 1, wherein the slot lengths extend from upstream ends to downstream ends, and wherein the upstream ends of the slots are located upstream of the leading edges of the airfoils relative to a flow of gas through the gaspath.

10. The compressor of claim 1, wherein a number of the grooves equals a number of inter-blade spacing, each of the inter-blade spacing defined between two circumferentially adjacent blades.

11. An aircraft engine, comprising:
a gaspath extending around a central axis and defined between a radially-inner wall and a radially-outer wall;
a compressor rotor having blades circumferentially distributed around the central axis, the blades having airfoils extending from roots to tips along a span and extending from leading edges to trailing edges along a chord, the airfoils extending across the gaspath; and
recesses distributed around the central axis and extending from a baseline surface of the radially-outer wall and away from the gaspath, the recesses at least partially axially overlapped by the tips of the airfoils, the recesses having chord-wise sections extending lengthwise in a direction parallel to the chords, and transversal sections extending lengthwise in a direction transversal to the chord-wise sections, the transversal sections disposed downstream from the leading edges of the blades, the chordwise sections projecting from the transversal sections.

12. The aircraft engine of claim 11, wherein the transversal sections extend solely circumferentially relative to the central axis.

13. The aircraft engine of claim 11, wherein the chord-wise sections have upstream ends located upstream of the leading edges of the airfoils.

14. The aircraft engine of claim 11, wherein the chord-wise sections have a radial depth extending from openings at the baseline surface of the radially-outer wall to ends, the chord-wise sections flaring in a depthwise direction away from the openings.

15. The aircraft engine of claim 11, wherein a chord-wise section of the chord-wise sections has a radial depth between an opening at the baseline surface to an end, the opening being circumferentially offset from the end.

16. The aircraft engine of claim 15, wherein the chordwise sections project upstream from the transversal sections relative to a flow in the gaspath.

17. The aircraft engine of claim 11, wherein the transversal sections have a radial depth between openings at the baseline surface to ends, the transversal sections flaring in a depthwise direction away from the openings.

18. The aircraft engine of claim 17, wherein a transversal section of the transversal sections extends axially from an upstream wall to a downstream wall, the upstream wall sloping towards the downstream wall and towards an opening of the openings.

19. The aircraft engine of claim 11, wherein each of the transversal sections is intersected by two of the chord-wise sections being circumferentially spaced apart from one another.

20. The aircraft engine of claim 11, wherein a number of the transversal sections equals a number of inter-blade spacing, each of the inter-blade spacing defined between two circumferentially adjacent blades.

\* \* \* \* \*